United States Patent
Galtier

(10) Patent No.: US 7,827,173 B2
(45) Date of Patent: Nov. 2, 2010

(54) METHOD FOR SORTING A SET OF ELECTRONIC DOCUMENTS

(75) Inventor: Jerome Galtier, Nice (FR)

(73) Assignee: France Telecom, Paris (FR)

( * ) Notice: Subject to any disclaimer, the term of this patent is extended or adjusted under 35 U.S.C. 154(b) by 389 days.

(21) Appl. No.: 12/067,570

(22) PCT Filed: Sep. 7, 2006

(86) PCT No.: PCT/FR2006/050856

§ 371 (c)(1),
(2), (4) Date: Mar. 20, 2008

(87) PCT Pub. No.: WO2007/034096

PCT Pub. Date: Mar. 29, 2007

(65) Prior Publication Data

US 2008/0208860 A1    Aug. 28, 2008

(30) Foreign Application Priority Data

Sep. 20, 2005   (FR) .................................. 05 52826

(51) Int. Cl.
   *G06F 17/30* (2006.01)
(52) U.S. Cl. ...................... 707/723; 726/748; 726/749; 726/752; 726/753
(58) Field of Classification Search .......... 707/999.003, 707/999.006, 999.007, 723, 726, 748, 749, 707/752, 753
See application file for complete search history.

(56) References Cited

U.S. PATENT DOCUMENTS

| 5,808,615 | A |   | 9/1998  | Hill et al. |
| 5,987,470 | A |   | 11/1999 | Meyers et al. |
| 6,633,868 | B1 | * | 10/2003 | Min et al. ......................... 1/1 |
| 6,862,710 | B1 | * | 3/2005  | Marchisio ................... 715/206 |
| 7,333,984 | B2 | * | 2/2008  | Oosta ......................... 707/750 |
| 2002/0156760 | A1 |   | 10/2002 | Lawrence et al. |
| 2005/0251514 | A1 | * | 11/2005 | Houle ........................... 707/3 |
| 2007/0150471 | A1 | * | 6/2007  | MacGregor .................... 707/6 |

FOREIGN PATENT DOCUMENTS

GB    2 338 324    12/1999

* cited by examiner

*Primary Examiner*—Don Wong
*Assistant Examiner*—Thanh-Ha Dang
(74) *Attorney, Agent, or Firm*—Oblon, Spivak, McClelland, Maier & Neustadt, L.L.P.

(57) ABSTRACT

Method of sorting a set of electronic documents, including, determining for each pair of documents {u,v} of the set the degree of correlation $\omega(u,v)$ between the documents u and v, determining a function X for projecting between the set of documents and a sphere of the set $R^d$ where d is a positive integer, the function X being such that, for at least one document u, the distance in $R^d$ between two points $X(u)$ and $X(v)$ where v is a document for which there is correlation between the documents u and v, is all the smaller the higher the degree of correlation, performing a sorting operation on at least part of the set of documents as a function of the values taken by the function X.

8 Claims, 1 Drawing Sheet

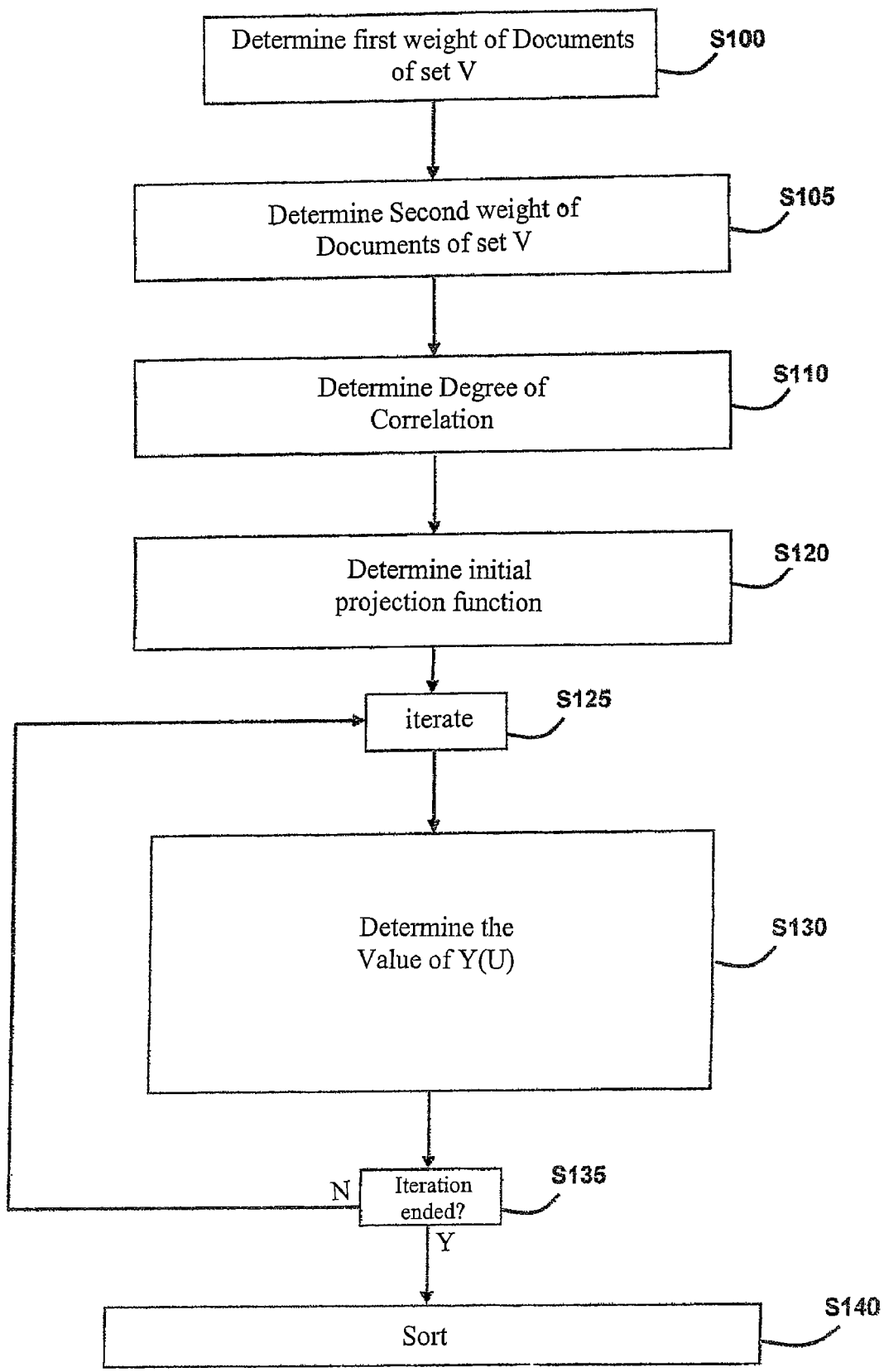

METHOD FOR SORTING A SET OF ELECTRONIC DOCUMENTS

The invention pertains to the fields of telecommunications and in particular to the field of search engines for searching for electronic documents.

More precisely the invention relates to a method of sorting a set of electronic documents. Such a set results for example from a search performed by a user by means of a search engine on a network of Internet type, the electronic documents being in this case Web pages (abbreviation of "World Wide Web"), which are accessible locally via a local storage medium or remotely via the network.

BACKGROUND

Search engines use several techniques for rating or sorting pages arising from a search. Among the known techniques for exploring a set of Web pages, some rely on semantics, a page being rated as being all the more relevant if it comprises a large number of occurrences of the word or words searched for. These techniques are sensitive to a practice, known by the name "spamming", aimed at making the words commonly employed by Internet users in their search query feature a very large number of times in a given page, this having the effect of making the page appear frequently as relevant.

Other techniques are based on the topological structure of the Web. These techniques take account at one and the same time of the existing links between the pages considered and of the properties of the pages themselves, such as the membership of a page in a network domain or subdomain of the Web. These techniques are generally based on a graph-type representation of the pages to be processed. They are appropriate to the classification of pages satisfying topological properties that are given in the graph. These techniques are sensitive to a variant of the method of "spamming" aimed at referencing a given page a large number of times, this having the effect of locally falsifying the topological characteristics of the graph of the Web.

Some of the techniques utilizing the topological structure of the Web consist in effecting a classification of the Web pages by allocating the various pages a rank which is dependent on the relationships between a page and the others.

An example of such a procedure, known by the term "PageRank", is used in the implementation of the Google™ search engine and is described in the document: "*The PageRank Citation Ranking: Bringing Order on the Web*", by L. Page, S. Brin, R. Motwani and T. Winograd; Technical Report, Computer Science Department, Stanford University, 1998.

The PageRank procedure orders the pages as a function of their visibility on the Web. In this procedure, random page by page browsing on the Web by following the hypertext links, is simulated. This browsing corresponds to that engendered by a user accessing the Web when the latter randomly activates one of the hypertext links located in a viewed page, so as to access another page. This procedure undertakes a probabilistic analysis of this simulated browsing so as to determine the probability of the user being on a given page during random page by page browsing such as this. The rank of a page is all the higher the higher the number of times that this page is cited by other pages.

Such a procedure provides a rating rank which is not necessarily relevant in relation to the search performed by a user, the best rated pages (of highest rank) not necessarily being the pages corresponding best to the user's expectations.

Furthermore, this procedure does not make it possible to identify in the set of documents thematic communities or communities of interest, capable of steering the user more rapidly to an interesting page.

Finally, in the case where a user identifies in the set of documents exhibited a document which is of particularly interest, it is not possible by using a list of documents ordered as a function simply of their rank, to readily determine whether other documents, close to the interesting document or linked with the latter in one way or another, are present in the set of documents.

SUMMARY

The objective of the invention is thus in particular to resolve the abovementioned drawbacks of the prior art by proposing a technique for sorting electronic documents, for example Web pages, which makes it possible in particular to detect problems of spamming, which is applicable to a large set of documents while being fast in its implementation, and which makes it possible to sort the documents simply, not by allocating rank, but by constructing communities of documents or subsets of documents that are close to one another, whether this concept of proximity be defined as a function of the semantic content of the documents, the hypertext links between these documents or some other way entirely.

With this aim, the subject of the invention is, according to a first aspect, a method of sorting a set of electronic documents, comprising:

a step of counting hypertext links or cocitations present between each pair of documents $\{u,v\}$ of said set, a step of determining, for each pair of documents $\{u,v\}$ of said set, a degree of correlation $\omega(u,v)$ between the documents u and v, said degree of correlation being dependent on the number of links that is obtained on completion of the counting step, a step of determining, for each document u of said set, an associated point $X(u)$ situated on a sphere of the set $R^d$ where R is the set of reals and d is a positive integer, for at least one document u1 of said set the distance in $R^d$ between the associated points $X(u1)$ and $X(u2)$, where u2 is a document for which there is correlation between the documents u1 and u2, being all the smaller the higher the degree of correlation between the documents u1 and u2, a step of sorting at least part of said set of documents as a function of the points determined on said sphere.

The fact of using a sphere to determine the position of the points is original in that this makes it possible to define simply for the points obtained—and therefore for the associated documents—relative positions of these points with respect to one another. Specifically, in this mode of representation no point is favored with respect to another. Consequently, the relative position between two points, and therefore the distance between these two points, can be used to represent a degree of correlation between the two documents associated with these two points. The representation thus obtained reflects the correlations or links between the documents concerned.

The fact of employing a representation of the set of documents on a sphere, for example a sphere in a three-dimensional space, makes it possible furthermore to envisage any type of sorting operations: by selection, rating, filtering, classification, and to do so very simply, since each document is henceforth represented by a simple n-tuple of coordinates in a space with N dimensions (for example by a triple of coordinates in a three-dimensional space).

There are multiple applications of the method: construction of clusters of documents, rating or selection of documents. These operations are performed in the space $R^d$ as a function of the spatial position of the projections of the documents or on the basis of distance measurement, that is to say by taking into account their degree of correlation or of proximity as determined.

The method according to the invention can for example be used to perform any kind of sorting operations, rating, classification of the WEB pages resulting from a search performed by means of a search engine, the most original pages, that is to say those which are furthest from the others, being for example rated top.

As an alternative or in combination, the pages are sorted by group, each group corresponding to a set of pages whose projections by the function X lie in a predefined spatial zone of the sphere of the space $R^d$. Preferably, in this variant, a partition of this sphere into spatial zones is defined, and the documents are rated according to the membership of their projection in one of the spatial zones of the partition.

The method according to the invention can also be used to detect the presence of "Spam", that is to say of pages which point to one another, since the projections of all these pages on the sphere S will lie substantially close to one another.

The method according to the invention can also be used to generate a visual representation of the WEB pages resulting from a search performed by means of a search engine.

According to a first variant of the method, in which at least one of the documents exhibits at least one hypertext link to at least one other document, the degree of correlation between two documents u and v is determined as a function of the number of hypertext links and/or of the number of cocitation links, present between the documents u and v, the degree of correlation being all the higher the higher this number, the absence of correlation corresponding to the absence of links.

This first variant advantageously allows the realization of sorting operations taking into account the hypertext links or cocitation links between documents.

According to a second variant of the method, the degree of correlation between two documents u and v is determined as a function of a measurement of proximity of the semantic contents of the documents u and v, the degree of correlation being all the higher the lower this measurement, the absence of correlation corresponding to a measurement below a predefined threshold.

This second variant advantageously allows the realization of sorting operations taking into account the semantic content of the documents.

According to a third variant, the degree of correlation is determined as a function of the favorite pages defined by a plurality of users. In this case, with each user is associated a set of documents (his favorite pages), the degree of correlation between two documents u and v being determined as being the number of such sets to which the documents u and v belong.

This third variant advantageously makes it possible to take account of user profiles in determining the degree of correlation between pages.

The three variants can furthermore be combined together so as to determine a degree of correlation which takes account at one and the same time of the hypertext links, the semantic content and/or preferably users. Any other type of link between two documents is also usable for defining a degree of correlation.

According to a particular embodiment, the method furthermore comprising:

a step of defining an initial function $X_0$ for projecting said set onto said sphere, a step of determining a function X for projecting said set onto said sphere, said projection function X being obtained on the basis of the initial function $X_0$ in at least one iteration, each iteration consisting in determining a function $X_i$ on the basis of the function $X_{i-1}$ obtained at the previous iteration by replacing, for at least one document u of said set, the value of $X_{i-1}(u)$ with the value $X_i(u)$ making it possible to optimize a predefined criterion which is dependent on the value of $X_{i-1}(u)$ as well as the values of $X_{i-1}(v)$ and the degrees of correlation $\omega(u, v)$ between the documents u and v for any document v belonging to said set.

The method according to the invention lends itself to an iterative determination of the function X, thereby simplifying its implementation and making it possible to precisely control the convergence of the method.

Preferably the function $X_0$ is defined in a random manner. The fact of starting from a random function statistically improves the speed of convergence to the desired function X, doing so without needing a priori knowledge about the function which is to be obtained.

In this embodiment, the optimization of the predefined criterion consists in maximizing for the document u the value of a quantity $\Delta(u)$ equal to:

$$\Delta(u) = \sum_{\{u,v\} \in E} \delta(u, v) \|X_{i-1}(u) - X_{i-1}(v)\|^2$$

with $\delta(u,v)=1-\omega(u,v)$, $0 \leq \omega(u,v) \leq 1$, $\omega(u,v)=0$ in the absence of correlation between the documents u and v, the value $X_i(u)$ being equal to $$X_i(u) = -Y(U)/\|Y(U)\| \text{ with}$$

$$Y(U) = \sum_{v \in V - \{u\}} \delta(u, v) X_{i-1}(v) \text{ if } Y(U) \neq 0,$$

the value $X_i(u)$ being equal to $X_{i-1}(u)$ if $Y(U)=0$.

The subject matter of the invention is also a computer program on an information medium readable by a computer system, said program comprising instructions for implementing a method according to the invention such as briefly defined above, when this program is loaded then executed by a computer system.

The subject matter of the invention is also a data processing device, comprising data processing means for the execution of the steps of a method according to the invention. Such a device is for example a computer server implementing a document search engine.

The subject matter of the invention is also a recording medium, readable by a computer system, comprising a program comprising program code instructions for the implementation of a method according to the invention when said program is executed by a computer system.

Other aims, characteristics and advantages of the invention will be apparent through the description which follows, given solely by way of nonlimiting example, and offered with reference to the appended drawings.

BRIEF DESCRIPTION OF THE DRAWING

FIG. 1 is a flowchart of an embodiment of the method according to the invention.

DETAILED DESCRIPTION

The method according to the invention is applied to a set of electronic documents, in particular a set of WEB pages, comprising, for some of them, one or more hypertext links to one or more other pages.

In the chosen embodiment illustrated, the degree of correlation between two documents u and v of the set of documents V is determined as a function of the number of hypertext links and cocitation links existing between the documents u and v.

For the determination of the number of hypertext links between two documents, no account is taken of the sense of the hypertext links and "symmetrized" hypertext links are considered, that is to say the same processing is applied to the case where the document u comprises a link to the document v and the case where the document v comprises a link to the document u.

Two documents u and v possess a cocitation link if there exists at least one other document w such that:
there exists at least one hypertext link pointing from w to u, and
there exists at least one hypertext link pointing from w to v.

The steps of the method according to the invention are now described in greater detail by reference to FIG. 1.

Step S100 consists in determining for any pair (u,v) of documents of the set V a weight $\omega_1(u,v)$ which is dependent on the number of hypertext links between the documents u and v. Preferably, the function $\omega_1(u,v)$ is an increasing function of the number of hypertext links between the documents u and v.

Preferably, the value of $\omega_1(u,v)$ lies between a predefined minimum value (typically 0) and a predefined maximum value (typically 1). In this case, the minimum value corresponds to the absence of hypertext links between the documents u and v, and the maximum value corresponds for example to the presence of a predefined minimum number of hypertext links between the documents u and v.

According to a first example, the value of $\omega_1(u,v)$ is chosen equal to 0 in the absence of hypertext link and equal to 1 in the presence of at least one hypertext link between the documents u and v.

According to a second example, the value of $\omega_1(u,v)$ is chosen equal to 0 in the absence of hypertext link, equal to 0.5 in the presence of a single hypertext link between the documents u and v and equal to 1 in the presence of two or more hypertext links between the documents u and v.

According to a third example, the value of $\omega_1(u,v)$ is defined as a continually increasing function of the number $N_h$ of hypertext links between the documents u and v, for example:

$$\omega_1(u,v) = \sqrt{\frac{N_h}{N_{hmax}}}$$

where $N_{hmax}$ is a ceiling threshold for the number $N_h$ of hypertext links.

Step S105 consists in determining for any pair (u,v) of documents of the set V a weight $\omega_2(u,v)$ which is dependent on the number of cocitation links between the documents u and v. Preferably, the function $\omega_2(u,v)$ is an increasing function of the number of cocitation links between the documents u and v.

The function definition examples given for $\omega_1(u,v)$ are transposable to $\omega_2(u,v)$. For example, the value of $\omega_2(u,v)$ is chosen equal to 0 in the absence of cocitation link and equal to 1 in the presence of at least one cocitation link between the documents u and V.

Step S110 consists in determining for any pair (u,v) of documents the degree of correlation $\omega(u,v)$ associated with a pair {u,v} by the relation $$\omega(u,v) = k_1 \omega_1(u,v) + k_2 \omega_2(u,v),$$

k1 and k2 being real coefficients such that,
$0 \leq k_1 \leq 1$,
$0 \leq k_2 \leq 1$,
$k_1 + k_2 = 1$.

The degree of correlation $\omega(u,v)$ thus takes real values lying between 0 and 1, the value 0 corresponding to the absence of links.

The value given to the coefficient k1 will be chosen all the higher as one wishes to give importance to the presence of hypertext links. On the contrary, the value given to the coefficient k2 will be chosen all the higher as one wishes to give importance to the presence of cocitation links.

This procedure for determining the degree of correlation between the documents makes it possible to take into account, in the method for classifying documents according to the invention, two types of links between documents: hypertext links and cocitation links.

This procedure is generalized to other types of links. For example, it is possible to define that two documents u and v are interlinked by an indirect hypertext link if there exist one or more hypertext links making it possible to pass from u to v, the number of hypertext links being in this case greater than or equal to 2.

According to another example, it is possible to consider the links of semantic type between the documents. In this case, the determination of the degree of correlation between two documents is performed on the basis of an analysis and a comparison of the semantic content of the two documents. With this aim, known procedures for comparing semantic content are applicable. The degree of correlation then represents a measure of the semantic proximity between the two documents. The degree of semantic correlation can be determined for example on the basis of a statistical analysis and comparison of the words contained in each of the documents. As a variant, it is possible to define a distance between two documents and to define the degree of correlation as a decreasing function of the defined distance, in such a way that the smaller the distance between two documents, the higher the degree of correlation between these documents.

The procedure is generalizable finally to an arbitrary number of links, whatever their type. The degree of correlation between two documents is then determined as a weighted sum of elementary degrees of correlation, for example a sum of a degree of correlation dependent on the number of cocitation links between the two documents and of a degree of correlation dependent on the semantic contents of the two documents. The procedure makes it possible to take account simultaneously of the information afforded by the hypertext links between documents and by the semantic content of the documents.

Returning to FIG. 1, the following steps S120 to S135 consist in determining a function X for projecting between the set V of documents and a sphere S of the set $R^d$ (d-th Cartesian power of R where R denotes the set of real numbers and d is a positive integer). Preferably d is chosen equal to 2 or to 3.

The function X determined is such that, for at least one document u, the distance in $R^d$ between two points X(u) and X(v) where v is a document for which there is correlation between the documents u and v, is all the smaller the higher the degree of correlation.

According to a particular embodiment, an iterative process is used to determine the function X. Each iteration of this iterative process consists in determining a function $X_i$ on the basis of the function $X_{i-1}$ obtained at the previous step, by replacing, for at least one document u of the set V, the value of $X_{i-1}(u)$ with the value of $X_i(u)$ making it possible to optimize a predefined criterion; this criterion is on the one hand dependent on the value of $X_{i-1}(u)$ obtained for the document u considered and of the values of the $X_{i-1}(v)$ obtained for any document v of the set V, and on the other hand, dependent on the degrees of correlation $\omega(u,v)$ between the document u and any document v of the set V. The criterion is chosen so as to make the series of functions $X_i$ converge to a function X exhibiting the properties stated above.

Preferably, the optimization of said predefined criterion consists in maximizing for a given document u the value of a quantity $\Delta(u)$ equal to, $$\Delta(u) = \sum_{\{u,v\} \in E} \delta(u,v) \|X(u) - X(v)\|^2$$

with $\delta(u,v)=1-\omega(u,v)$, $0 \leq \omega(u,v) \leq 1$, and $\omega(u,v)=0$ in the absence of correlation between the documents u and v.

In step S120, the initial projection function $X_0$ is determined. Preferably, the initial function $X_0$ takes random values on the sphere S. The iterative process is thereafter applied to the current function $X_i=X_0$.

The iterative process of determining the projection function X begins from step S125. An iteration corresponds to the execution of steps S125, S130 and S135. The iterations are indexed by the index i. At the end of step S120 the index i takes its initial value and equals 0.

In step S125 this index is incremented: i=i+1.

In step S130, the following operations are performed for at least one document u:
the value of $$Y(U) = \sum_{v \in V-\{u\}} \delta(u,v) X_{i-1}(v)$$

is determined
if $Y(U) \neq 0$, then $X_i(u)$ is calculated from Y(U) by $X_i(u)=-Y(U)/\|Y(U)\|$,
if Y(U)=0, then $X_i(u)$ is taken equal to $X_{i-1}(u)$.

In step S135, it is determined whether the iterative process has ended. Preferably, the process is iterated a sufficient number of times for the function X to be modified at least once for each document u of the set V.

The series of functions $X_i$ converging rapidly, even with a random starting function, it is possible to iterate a limited number of times on the set of documents.

The decision to stop the iterations can also be based on:
the number of iterations already performed,
a measurement of the convergence of the function, performed after each iteration.

This measurement of the convergence can be performed by calculating after each iteration the sum $\Delta_i$ in the following manner:

$$\Delta_i = \sum_{u \in V} \|X_i(u) - X_{i-1}(u)\|$$

and by fixing a threshold value, possibly dependent on the number of documents u of the set V, below which the iterative process stops.

If, in step S135, the decision to stop the iterative process is taken, step S140 is thereafter executed; otherwise the following iteration is executed, starting from step S125.

In step S140, a sorting operation is performed on at least part of the set V of documents as a function of the values taken by the function X obtained at the last iteration.

By virtue of the projection function X determined, the position of a points X(u) on the sphere S is dependent on the links between the document u and the other documents. In particular the distance between two points is representative of degree of correlation between the documents corresponding to these two points.

It is conceivable to use other mathematical criteria to make the initial random function converge to such a function.

In the case where the set V is a set of WEB pages resulting from a search performed by means of a search engine, this sorting operation can be aimed at:
selecting the most original pages, by detecting the pages having the projections furthest from the other projections;
filtering the pages containing "Spam" (pages which point to one another) by detecting the pages whose projections are substantially close to the projections of a group of pages;
selecting the pages whose projections satisfy a determined criterion.

According to a first variant, the sorting operation comprises the following operations:
calculation for any pair $\{u,v\}$ of the set V of the value of the distance $d(u,v)=\|X(u)-X(v)\|$,
determination of at least one subset $V_1$ of the set V on which the value d(u,v) satisfies a predefined criterion, for example by being above or below a predefined threshold.

This first variant makes it possible to detect clusters of points on the sphere and therefore to determine the corresponding clusters of documents.

According to a second variant the sorting operation comprises the operation consisting in determining a subset $V_1$ for which any point X(u) belongs to a determined set, for example to a predefined zone in space in $R^d$.

This zone can be for example the interior volume of a sphere, of a cube, or else a surface defined on the sphere S of $R^d$. By repeating this operation for several predefined zones, it is possible to construct partitions or a segmentation of the set of documents.

The method according to the invention thus makes it possible to perform any kind of sorting operations on a set of documents, on the basis of the values taken by the determined function X.

Furthermore, it is possible to demonstrate that the process for determining the function X converges rapidly.

Moreover, the calculation time for an iteration of this process is proportional to the number of hypertext links when the degree of correlation is determined as a function of this number of hypertext links. The method of the invention can therefore be used on a large number of pages.

Finally, should the set of electronic documents be modified, (by document addition, document deletion or modification of links between documents), it suffices to start from the function X obtained for the unmodified set, and then to undertake the execution of step 130 for a few chosen documents (preferably at least for the documents having undergone modification or having been added) so as to determine a corrected function X which takes into account the modified set of electronic documents. The invention is therefore particularly suited to the processing of sets containing a large number of documents, of which a part is regularly updated.

In a variant of the method according to the invention, a graphical representation of the function X is generated, that is to say a representation of said sphere and of the points X(u) situated on said sphere. The fact of generating such a graphical representation makes it possible to facilitate the selection by the user of relevant document sets. This representation can be done for example in the form of a two-dimensional cartographic representation, in which each document is demarcated by a graphical symbol corresponding to the value of the function X determined for this document.

The invention thus lends itself to an embodiment in which this graphical representation is displayed on a user's computer terminal, comprising a display screen and a graphical selection tool (for example a mouse used in combination with a pointer making it possible to define graphical zones on the screen), this tool being appropriate for selecting at least part of the graphical representation.

The user is then able to perform a selection of one or more parts of the graphical representation corresponding to one or more sets, chosen by the user, of documents. The terminal obtains, via the graphical selection tool, data defining the selected parts. As a function of these data, the terminal sorts the set V of documents. It generates for example a reduced list of documents, corresponding to the documents whose projection lies in the parts selected by the user. As an alternative, the documents whose projection lies in the selected parts are on the contrary eliminated. On the basis of the list of documents retained by the user, additional sorting operations can be performed, these operations being either performed automatically on the basis of the properties of documents or their degree of correlation, or else performed manually, on the basis of new parts selected inside the initially selected parts.

This mode of viewing the results of a search performed by a search engine is particularly ergonomic for the user. It reveals communities of documents, in the form of a set of mutually close points.

The projection-based representation such as defined in the invention therefore makes it possible to perform a sort or a classification, either visually and manually by means of a graphical selection tool, or automatically, according to predefined criteria linked with the position of these documents in the representation generated.

According to a preferred implementation, the steps of the method of sorting electronic documents, according to the invention, are determined by instructions of a computer program.

Here, "computer program" is understood to mean one or more computer programs forming a set (software) whose purpose is the implementation of the invention when it is executed by an appropriate computer system.

The method according to the invention is then implemented when the aforesaid program is loaded into computer means incorporated, for example, into a user terminal linked if appropriate to a network of Internet type and equipped with Internet browser software.

Consequently, the subject of the invention is also such a computer program, in particular in the form of software stored on an information medium. Such an information medium can consist of any entity or device capable of storing a program according to the invention.

For example, the medium in question can comprise a hardware storage means, such as a ROM, for example a CD ROM or a microelectronic circuit ROM, or else a magnetic recording means, for example a hard disk. As a variant, the information medium can be an integrated circuit into which the program is incorporated, the circuit being adapted to execute or to be used in the execution of the method in question.

Moreover, the information medium can also be a transmissible non-hardware medium, such as an electrical or optical signal that can be trunked via an electrical or optical cable, by radio or by other means. A program according to the invention can be in particular downloaded from a network of Internet type.

From a design point of view, a computer program according to the invention can use any programming language and be in the form of source code, object code, or of code intermediate between source code and object code (e.g., a partially compiled form), or in any other desirable form for implementing a method according to the invention.

The invention claimed is:

1. A method of sorting a set of electronic documents at a processing apparatus, comprising:
   determining, with a processor for each pair of documents $\{u,v\}$ of said set, a degree of correlation $\omega(u,v)$ between the documents u and v;
   determining, for each document u of said set, an associated point X(u) situated on a sphere of the set $R^d$ where R is a set of real numbers and d is a positive integer, wherein for at least one document u1 of said set a distance in Rd between associated points X(u1) and X(u2), the distance being smaller relative to an increase in the degree of correlation between the documents u1 and u2, where u2 is a document for which there is correlation between the documents u1 and u2; and
   generating a representation of said sphere and of points determined on said sphere to enable an operation of sorting or selection to be performed on said set of documents as a function of the points determined on said sphere.

2. The method as claimed in claim 1, in which at least one of said documents comprises at least one hypertext link to at least one other document, the degree of correlation between two documents u and v being determined as a function of a number of hypertext links, or of a number of cocitation links, present between the two documents u and v, the degree of correlation being higher relative to the number of links, an absence of correlation corresponding to an absence of links.

3. The method as claimed in claim 1, in which the degree of correlation between two documents u and v is dependent on a measurement of proximity of semantic contents of the documents u and v, a degree of correlation increasing as said measurement decreases, an absence of correlation corresponding to a measurement below a predefined threshold.

4. The method as claimed in claim 1, comprising:
   defining an initial function $X_0$ for projecting said set onto said sphere; and
   determining a function X for projecting said set onto said sphere, said projection function X being obtained on a basis of the initial function $X_0$ in at least one iteration, each iteration including determining a function $X_i$ on the basis of the function $X_{i-1}$ obtained at a previous iteration by replacing, for at least one document u of said set, a value of $X_{i-1}(u)$ with a value $X_i(u)$ making it possible to optimize a predefined criterion which is dependent on the value of $X_{i-1}(u)$ and the values of $X_{i-1}(v)$ and degrees of correlation $\omega(u,v)$ between the documents u and v for any document v belonging to said set.

5. The method as claimed in claim 4, in which optimization of said predefined criterion includes maximizing for the document u a value of a quantity $\Delta(u)$ equal to, $$\Delta(u)=\Sigma_{\{u,v\}\in E}\delta(u,v)\|X_{i-1}(u)-X_{i-1}(v)\|^2$$

with $\delta(u,v)=1-\omega(u,v)$, $0\leq\omega(u,v)\leq 1$, $\omega(u,v)=0$ in absence of correlation between the documents u and v, the value $X_i(u)$ being equal to $X_i(u)=-Y(U)/\|Y(U)\|$ with $Y(U)=\Sigma_{v\in V-\{u\}}\delta(u,v)\ \delta(u,v)\ X_{i-1}(v)$ if $Y(U)\neq 0$, the value $X_i(u)$ being equal to $X_{i-1}(u)$ if $Y(U)=0$.

6. The method as claimed in claim 1, further comprising: generating a graphical representation of said sphere and of the points X(u) situated on said sphere.

7. The method as claimed in claim 6, further comprising:
  displaying said graphical representation on a terminal;
  providing a user of the terminal with an appropriate graphical selection tool for receiving graphical selection command of at least one part of said graphical representation;
  obtaining data defining said at least one part selected by said selection command; and
  performing a sort on said set of documents as a function of said data.

8. A non-transitory computer readable storage medium including program code instructions for causing a processor to execute the method of claim 1.

* * * * *